United States Patent
Filonczuk

(10) Patent No.: US 6,561,481 B1
(45) Date of Patent: May 13, 2003

(54) FLUID FLOW CONTROL APPARATUS FOR CONTROLLING AND DELIVERING FLUID AT A CONTINUOUSLY VARIABLE FLOW RATE

(76) Inventor: Michael A. Filonczuk, 5732 Oakdale Ave., Woodland Hills, CA (US) 91367

(*) Notice: Subject to any disclaimer, the term of this patent is extended or adjusted under 35 U.S.C. 154(b) by 137 days.

(21) Appl. No.: 09/929,678

(22) Filed: Aug. 13, 2001

(51) Int. Cl.[7] ............................................. F16K 31/02
(52) U.S. Cl. ......................... 251/129.12; 251/315.01; 239/69; 239/578
(58) Field of Search ..................... 251/129.04, 129.11, 251/129.12, 129.13, 315.01; 239/69, 578, 530

(56) References Cited

U.S. PATENT DOCUMENTS

| | | |
|---|---|---|
| 3,680,831 A | 8/1972 | Fujiwara |
| 3,786,869 A | 1/1974 | McLoughlin |
| 3,974,879 A | 8/1976 | Nelson, Jr. et al. |
| 4,592,505 A | 6/1986 | Bruninga et al. |
| 4,624,281 A * | 11/1986 | Vidal et al. ............. 251/315.16 |
| 4,705,063 A * | 11/1987 | Robinson ............... 251/129.12 |
| 4,858,827 A * | 8/1989 | Fletcher et al. ................ 239/69 |
| 5,109,534 A | 4/1992 | Naito et al. |
| 5,174,546 A * | 12/1992 | Giordani ................ 251/129.12 |
| 5,178,361 A * | 1/1993 | Gilbert et al. ......... 251/129.12 |
| 5,228,645 A * | 7/1993 | Reinicke ................ 251/129.11 |
| 5,263,824 A | 11/1993 | Waldbeser et al. |
| 5,687,950 A * | 11/1997 | Woodcock ............... 251/129.2 |
| 5,715,866 A * | 2/1998 | Granger ....................... 239/69 |
| 5,813,655 A | 9/1998 | Pinchott et al. |
| 5,975,160 A | 11/1999 | Rush |
| 5,999,087 A | 12/1999 | Gunton |
| 6,052,841 A * | 4/2000 | Mankin et al. ......... 251/129.12 |
| 6,186,162 B1 * | 2/2001 | Purvis et al. .......... 251/129.12 |
| 6,186,471 B1 * | 2/2001 | Genga et al. .......... 251/129.12 |
| 6,283,139 B1 * | 9/2001 | Symonds et al. ............... 239/69 |
| 6,337,635 B1 * | 1/2002 | Ericksen et al. ....... 251/129.04 |

* cited by examiner

Primary Examiner—Ehud Gartenberg
Assistant Examiner—John Bastianelli

(57) ABSTRACT

A fluid flow control apparatus for controlling and delivering fluid at a continuously variable flow rate to a hose. The fluid control apparatus comprises a fluid-tight housing for housing a control assembly, a rotating ball valve for allowing fluid to flow therethrough and increasing or decreasing the amount of fluid flow, a fluid hose for supplying fluid therethrough, and a switch attached to the outflow end of the fluid hose for activating the control mechanism.

32 Claims, 3 Drawing Sheets

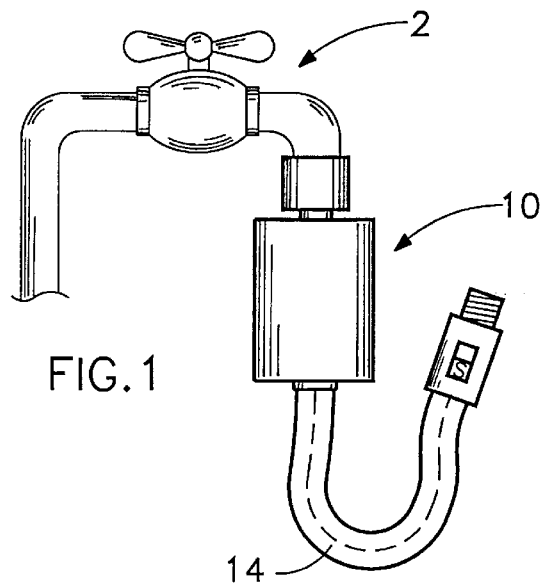
FIG. 1
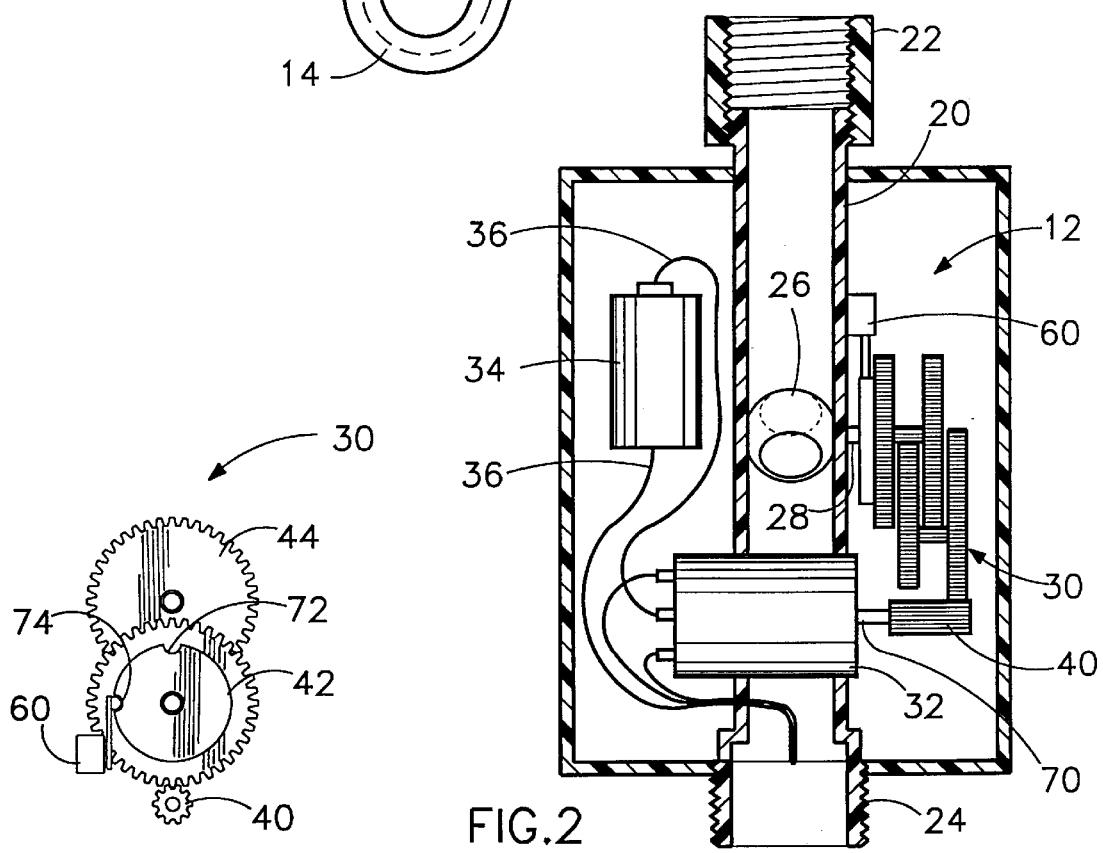
FIG. 5
FIG. 2

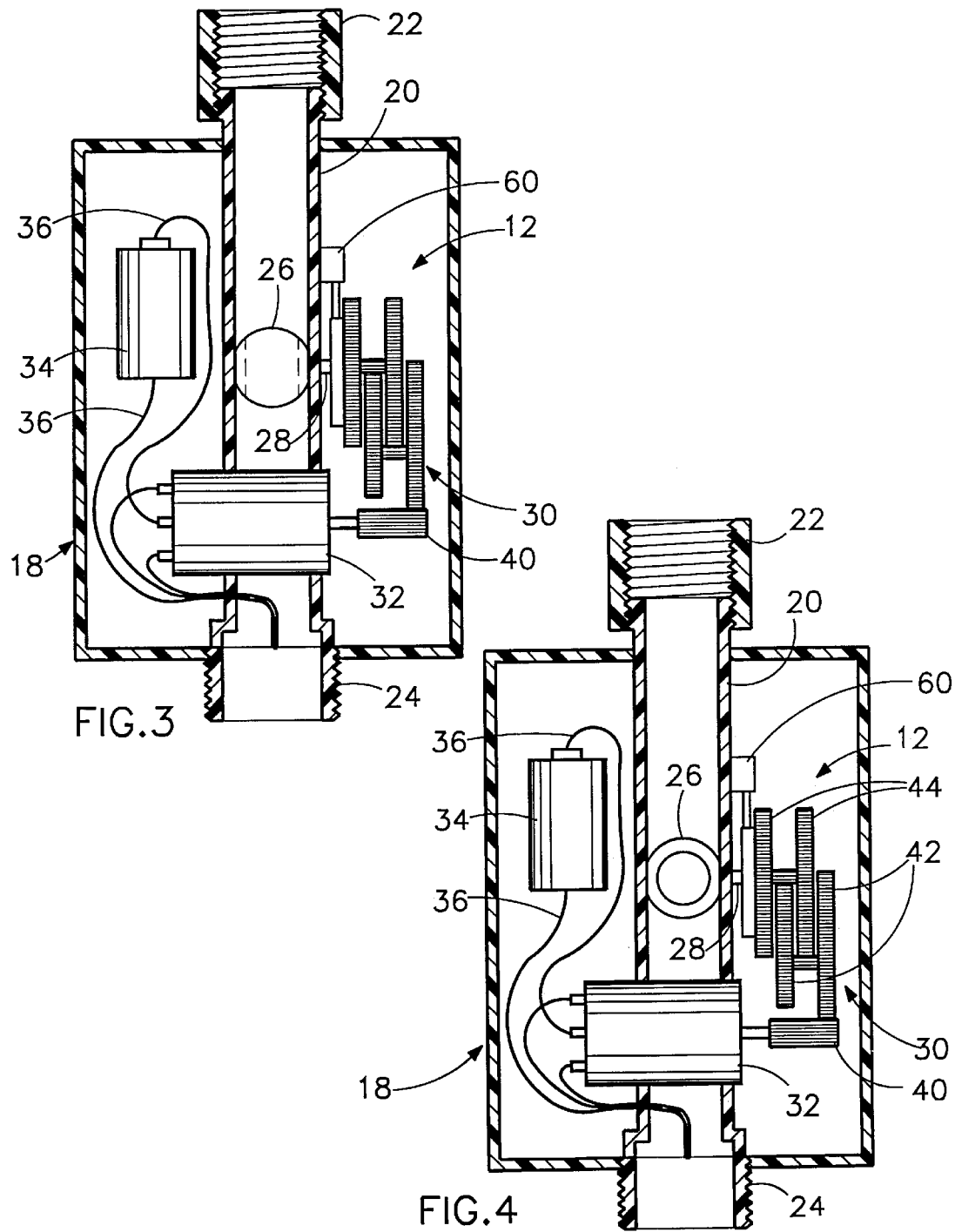

FLUID FLOW CONTROL APPARATUS FOR CONTROLLING AND DELIVERING FLUID AT A CONTINUOUSLY VARIABLE FLOW RATE

BACKGROUND OF THE INVENTION

1. Field of the Invention

The present invention relates generally to the field of fluid flow control devices for controlling the fluid flow through hoses. More particularly, the present invention relates to an apparatus for delivering fluid at a continuously variable flow rate to a hose.

2. Description of the Prior Art

Specifically, water hoses are well known in art. Typical prior art hoses are garden-type hoses, laboratory-type hoses, workshop-type hoses or manufacturing-type hoses which are attached to a hose bib at the fluid supply line and the fluid flow is controlled by turning on the hose bib at the fluid supply line which causes the fluid to flow through the hose and out the outflow end of the hose. Unfortunately, the outflow end of the hose often requires the fluid to be directed so that the fluid can flow to the task location which is not at the same location as the fluid supply line, thereby spilling and wasting the fluid. Therefore, oftentimes operation of the hose would require two people to do a job, one at the hose bib supply and the other at the outflow end of the hose, for example hosing a vehicle or watering plants.

The only way to stop water waste is that the garden hose would have to be kinked for the hose to stop the water flow or installing a pressure nozzle on the outflow end of the hose that would block the water flow. These methods have the disadvantages of creating pressure build up within the hose which can cause the hose to burst and also wear out the hose.

When the fluid pressure is finally released either by unkinking the hose or pulling a trigger or handle on the pressure nozzle, the massive pressure-driven fluid can explode from the hose outflow end in an uncontrolled manner, thereby harming delicate plants with overly high fluid pressure or inaccurately spraying the vehicle's engine while trying to hit the radiator opening. To avoid these problems oftentimes two persons were required to operate the hose, one being at the hose-bib source end of the hose, and another being at the outflow end of the hose.

Another disadvantage with prior art hoses is that they are hard to maneuver once the fluid is flowing through them since at this time the hose is heavy and usually kinked and tangled.

In addition, under conditions where a precise amount of fluid is used, for example in laboratory conditions, the same problems exist which occur in common utility hoses but are more critical. This requires an extra work step to be made as fluids are first measured out into a graduated beaker and then transferred to their final location. A more controllable and single step method is required in these situations which would thereby allow the control of a precise amount of fluid to flow both in the hose and a precise amount of fluid to be expelled out the outflow end of the hose.

The following nine (9) prior art patents are found to be pertinent to the field of the present invention:

1. U.S. Pat. No. 3,680,831 issued to Fujiwara on Aug. 1, 1972 for "Electrically Driven Valve Apparatus" (hereafter the "Fujiwara");
2. U.S. Pat. No. 3,786,869 issued to McLoughlin on Jan. 22, 1974 for "Nozzle Pressure Control System" (hereafter the "McLoughlin");
3. U.S. Pat. No. 3,974,879 issued to Nelson, Jr. et al. on Aug. 17, 1976 for "Method And Apparatus For Delivering Constant Water Flow Rates To A Fire Hose At Each Of A Plurality Of Selectable Flow Rate Settings" (hereafter the "Nelson");
4. U.S. Pat. No. 4,592,505 issued to Bruninga on Jun. 3, 1986 for "Quick Disconnect Mounted Programming Means For Sprinkler" (hereafter the "Bruninga");
5. U.S. Pat. No. 5,109,534 issued to Naito et al. on Apr. 28, 1992 for "Cable Communication System With Transmission Line Incorporated In Hose" (hereafter the "Naito");
6. U.S. Pat. No. 5,263,824 issued to Waldbeser et al. on Nov. 23, 1993 for "Remote Controlled Shutdown For Hazardous Material Transport Vehicle" (hereafter the "Waldbeser");
7. U.S. Pat. No. 5,813,655 issued to Pinchott on Sep. 29, 1998 for "Remote-Control On/Off Valve" (hereafter the "Pinchott");
8. U.S. Pat. No. 5,975,160 issued to Rush on Nov. 2, 1999 for "Emergency Discharge Control System For Storage Tank And Cargo Tank Motor Vehicle" (hereafter the "Rush"); and
9. U.S. Pat. No. 5,999,087 issued to Gunton on Dec. 7, 1999 for "Timer And Alarm Apparatus For Control Delivery Of Fluid Material" (hereafter the "Gunton").

Fujiwara discloses an electrically driven valve apparatus. The valve apparatus has either a fully open condition or a fully closed condition.

McLoughlin discloses a nozzle pressure control system for a fire engine pumper. It comprises a pump driven by a truck engine which comprises engine governor means connected to and responsive to the pump output pressure and engine throttle means to regulate engine speed to maintain pump output pressure, a motorized valve connected between the pump and the hose, and means to control the valve from the nozzle location.

Nelson discloses a method and apparatus for delivering constant water flow rates to a fire hose at each of a plurality of selectable flow rate settings. The apparatus comprises a transmitter which transmits a digital signal corresponding to a particular fire hose and a pumper truck. A receiver receives and decodes the digital signal and activates a multi-position valve in response to the decoded signal to set a particular valve position. The apparatus maintains a constant flow rate to the fire hose by automatically varying the valve position in response to changes in the pump output pressure and pressure drop in the fire hose. Nelson does not teach a motorized ball valve but rather teaches a combination of three instant full-on and full-off solenoid activated pressure valves controlled by a complicated digital electronic controller to a limited pressure output combination. Nelson relies upon these types of valves due to the extremely high pressures and volume of water that are inherent to fire hoses.

Bruninga discloses a quick disconnect mounted programming means for a sprinkler. Bruninga teaches a motorized ball valve which can be fully open or fully closed. The apparatus comprises a valve moving mechanism operable in response to the connection of the electric current from a battery for effecting movement of a motorized ball valve from its closed position into its opened position, a programming keyboard for selecting a sprinkling time in the future when it is desired to water with the sprinkler, a display for displaying the sprinkling time selected by the programming keyboard and an electrical connection operable when the sprinkling time selected arrives for connecting an electrical current from the battery with the valve moving mechanism.

Naito discloses a cable communication system with a transmission line incorporated in a hose for communication between a water injection nozzle and a fire-engine. The device of Naito functions with a fire engine and the valve is not a ball valve.

Waldbeser discloses a remote controlled shutdown for a hazardous material transport vehicle and permits turn-off of the vehicle's engine and closure of the vehicle's storage tank valves by the vehicle's operator remotely located from the vehicle. The system includes a hand-held controller which includes a receiver and transmitter as well as a receiver/transmitter combination located in the vehicle's cab.

Pinchott discloses a remote-control on/off valve. It comprises a water-power motor for driving the valve into an open position or closed position. The valve has a pilot device for starting water flow through the water-powered motor, where the pilot device is briefly energized to start water flow through the water-powered motor.

Rush discloses an emergency discharge control system for storage tank and cargo tank motor vehicle. The system comprises a cylinder with a piston rod connected to a cable assembly of the cargo tank motor vehicle and a cylinder with a piston rod connected to a cable assembly of the primary storage tank for actuating the respective cable assemblies and closing the vapor valves and the liquid valves of the cargo tank and the primary storage tank.

Gunton discloses a timer and alarm apparatus for a control delivery of fluid material.

It is desirable to provide a fluid flow control apparatus for controlling and delivering fluid at a continuously variable flow rate to a hose.

SUMMARY OF THE INVENTION

The present invention is a fluid flow control apparatus for controlling and delivering fluid at a continuously variable flow rate to a hose. The fluid control apparatus comprises a fluid-tight housing for housing a control mechanism, a fluid hose for supplying fluid therethrough, and a switch attached to an outflow end of the fluid hose for activating the control mechanism.

It is an object of the present invention to provide a fluid flow control apparatus for controlling and delivering fluid at a continuously variable flow rate to a water hose.

It is also an object of the present invention to provide a fluid flow control apparatus which is connected at a fluid supply source, where the fluid flow control apparatus can be remotely controlled by a user at a fluid outflow end of the hose.

It is an additional object of the present invention to provide a fluid flow control apparatus which is controlled by a momentary switch for controlling and delivering fluid when the user turns the momentary switch on or off.

It is a further object of the present invention to provide a fluid flow control apparatus, wherein the longer a user holds down a switch, the more the fluid is delivered and when the proper fluid flow rate is achieved the user releases the momentary switch and the fluid flow rate remains constant.

It is still an object of the present invention to provide a fluid flow control apparatus that saves fluid.

It is still an additional object of the present invention to provide a fluid flow control apparatus which stops the flow of fluid at the fluid supply source so that the flexible hose can be easily moved from place to place without fluid within the hose.

It is still a further object of the present invention to provide a fluid flow control apparatus which includes an adjustable gauge, a switch assembly coupled to the adjustable gauge, and a valve and motor assembly, thereby allowing the control of a precise amount of fluid to flow out of the hose.

It is still a further object of the present invention to provide a fluid flow control apparatus which is wireless for controlling and delivering fluid at a continuously variable flow rate to a water hose.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an illustration of the present invention fluid flow control apparatus installed on a conventional fluid supply source;

FIG. 2 is a partial cross-sectional view of a control assembly in accordance with the present invention fluid flow control apparatus, showing a ball valve in its continuously variable open position;

FIG. 3 is a partial cross-sectional view of the control assembly shown in FIG. 2, showing the ball valve in its fully open position;

FIG. 4 is a partial cross-sectional view of the control assembly shown in FIG. 2, showing the ball valve in its fully closed position;

FIG. 5 is a side elevational view of a reduction gear assembly in accordance with the present invention fluid flow control apparatus;

DETAILED DESCRIPTION OF THE PREFERRED EMBODIMENTS

Figure 6:
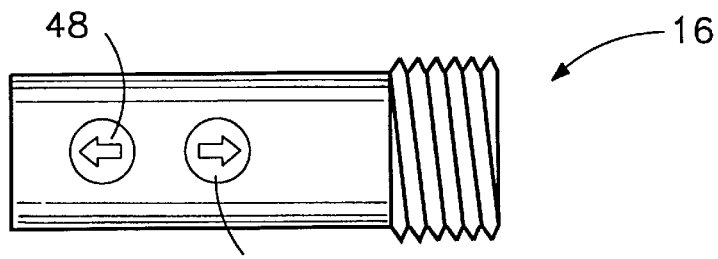
FIG. 6 is a top plan view of an outflow end of a fluid hose in accordance with the present invention fluid flow control apparatus.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown at 10 the present invention fluid flow control apparatus for controlling and delivering fluid at a continuously variable flow rate through an elongated flexible hose 14 and installed on a conventional fluid supply line 2, such as a residential water supply line.

Referring to FIGS. 1 through 6, the apparatus 10 includes a control assembly 12, an elongated hollow fluid hose 14 and a momentary switch 16 or other suitable switches. The control assembly 12 is housed in a fluid-tight structure 18 which may be generally a rectangular shape and transparent.

Referring to FIGS. 2, 3, 4 and 5, the control assembly 12 includes a valve tube body 20 which extends the length of the fluid-tight structure 18, where the ends of the valve tube body 20 are respectively extended out from end walls of the fluid-tight structure 18. The ends of the valve tube body 20 and the end walls of the fluid-tight structure 18 are sealed with silicon or other suitable means. At one end of the valve tube body 20 is a female hose connector 22 and the other end of the valve tube body 18 is a male hose connector 24. It will be appreciated that instead of the male hose connector 24, the hose can be simply attached to the other end of the valve tube body 20, where a clamp member (not shown) can secure the end of the hose to the end of the valve tube body 20.

The female hose connector 22 is connected to the fluid supply source 2 while the male hose connector 24 may be connected to a female hose connector of the flexible water hose 14. A rotating ball valve 26 is provided and positioned within the valve tube body 20, where the ball valve is rotatable by a rotating axle 28 which is connected to a side of the ball valve 26 and extends out from a side of the valve tube body 20. The ball valve 26 can be incrementally moved between a fully open position (see FIG. 3) and a fully closed position (see FIG. 4), wherein the ball valve 26 can be in a continuously varying open position (see FIG. 2). The ball valve 26 controls the fluid flow rate through the hose 14.

Referring to FIGS. 2, 3, 4 and, 6, there is provided a reduction gear assembly 30 which operates the ball valve 26 for rotating the ball valve 26 to a variable open position and is controlled by an electric reversible motor 32 housed within the fluid-tight structure 18. The reversible motor 32 is coupled to a drive pinion 40 by a rotating shaft 70, where the drive pinion 40 is coupled to an outer driving wheel 42 of the reduction gear assembly 30. In this configuration of the reduction gear assembly 30, a 2000:1 ratio is achieved for controlling a ball valve 26. The reversible motor 32 is electrically connected to a power supply 34 by electrical wires 36, where the power supply 34 supplies power to the reversible motor 32. The power supply 34 may be batteries. By way of example, the batteries may be "AA" batteries, "D" batteries, "C" batteries or any other suitable power supply.

Referring to FIG. 5, the momentary switch 16 is attached to the outflow end of the fluid hose 14 and controls the electric reversible motor 32. The switch 16 includes a forward direction button 46 and a reverse direction button 48. The switch 16 is hardwired to the reversible motor 32 for controlling the gear reduction assembly 30 which in turn controls the movement of the ball valve 26. The hardwired is shown in dashed lines (see FIG. 1). As the forward direction button 46 is continuously being pressed by the user, the ball valve 26 is continuously being incrementally open until the ball valve 26 is in the fully open position (see FIG. 3). When the user stops pressing on the forward direction button 46, the ball valve 26 will stop at whatever position it was at, thereby allowing a control flow rate to be created through the hose 14. As the reverse direction button 48 is continuously being pressed by the user, the ball valve is continuously being incrementally closed until the ball valve 26 is in the fully closed position (see FIG. 4). There is provided a limit switch 60 for limiting the rotation of the ball valve 26. The limit switch 60 functions with a lever having a ball at one end. A rotating plate is attached to the ball valve 26 by the rotating axle 28, where the rotating plate is part of the gear reduction assembly 30. The rotating plate has two detents 72 and 74 located on the perimeter and spaced apart by 90°. When the gear reduction assembly 30 rotates 90°, the ball lever of the limit switch 60 drops into the second detent 72 indicating that the ball valve 26 is fully on and when it rotates back 90° it drops into the first detent 74 indicating that the ball valve 26 is fully off.

Further activation of the forward direction button 46 or the reverse direction button 48 can continuously vary the flow rate to increase or decrease, thereby opening the ball valve 26 or closing the ball valve 26.

The present invention conforms to conventional forms of manufacture or any other conventional way known to one skilled in the art, and is of simple construction and is easy to use.

Figure 8:
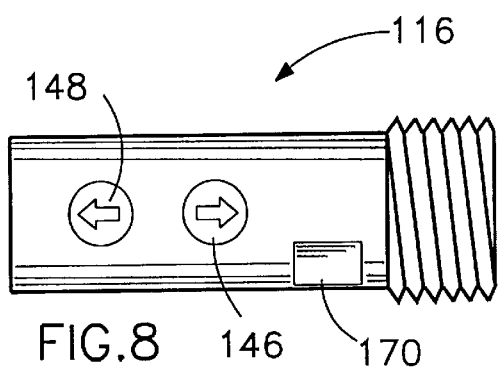
FIG. 8 is a top plan view of an alternative embodiment of an outflow end of a fluid hose in accordance with the present invention fluid flow control apparatus shown in FIG. 7.
Figure 7:
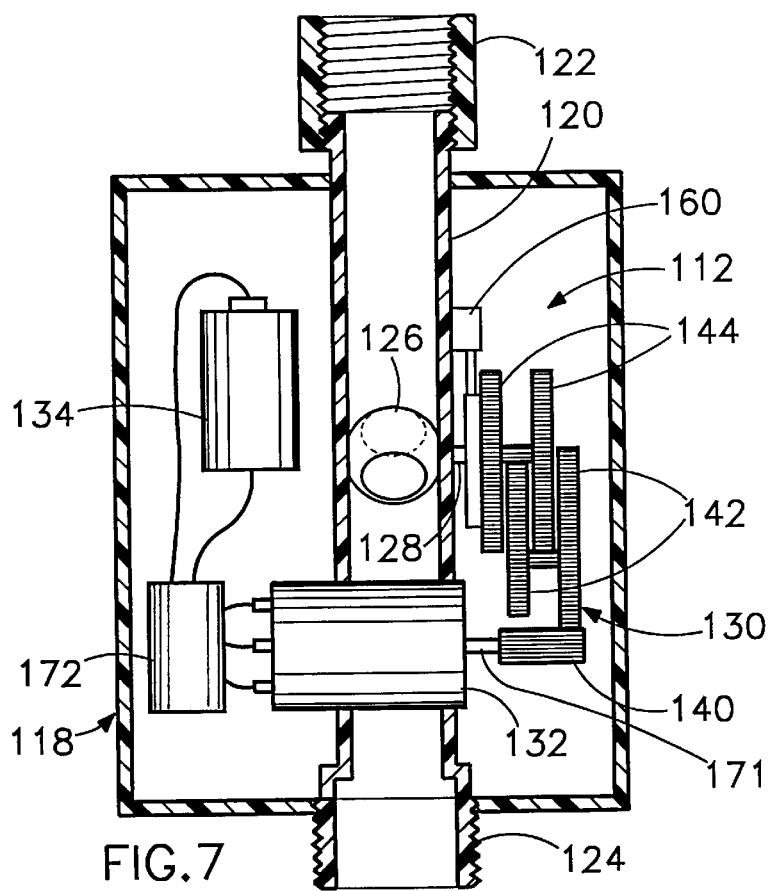
FIG. 7 is a partial cross-sectional view of an alternative embodiment of a control assembly in accordance with the present invention fluid flow control apparatus, showing a ball valve in its continuously variable open position.

Referring to FIGS. 7 and 8, there is shown an alternative embodiment of the present invention fluid flow control apparatus for controlling and delivering fluid at a continuously variable flow rate through an elongated flexible hose 14 and installed on a conventional fluid supply line 2 (see FIG. 1).

Since it assembles and functions the same as previously described above except that the fluid flow control apparatus utilizes a transmitter member 170 and a receiver member 172 for controlling the fluid flow control apparatus, the parts are numbered corresponding with 100 added to each number. Since the transmitter member 170 and the receiver member 172 are well known in the art, the description thereof will only be described in general terms.

The apparatus includes a control assembly 112, an elongated hollow fluid hose 14 (see FIG. 1) and a momentary switch 116 or other suitable switches. The control assembly 112 is housed in a fluid-tight structure 118. The control assembly 112 includes a valve tube body 120 which extends the length of the fluid-tight structure 118, where the ends of the valve tube body 120 are respectively extended out from end walls of the fluid-tight structure 118. The ends of the valve tube body 120 and the end walls of the fluid-tight structure 118 are sealed with silicon or other sealable suitable means. At one end of the valve tube body 120 is a female hose connector 122 and the other end of the valve tube body 120 is a male hose connector 124. It will be appreciated that instead of the male hose connector 124, the hose can be simply attached to the other end of the valve tube body 120, where a clamp member (not shown) can secure the end of the hose to the end of the valve tube body 120.

The female hose connector 122 is connected to the fluid supply source 2 (see FIG. 1) while the male hose connector 124 may be connected to a female hose connector of the flexible water hose 14. A rotating ball valve 126 is provided and positioned within the valve tube body 120, where the ball valve is rotatable by a rotating axle 128 which is connected to a side of the ball valve 126 and extends out from a side of the valve tube body 120. The ball valve 126 can be incrementally moved between a fully open position (see FIG. 3) and a fully closed position (see FIG. 4), wherein the ball valve 126 can be in a continuously varying open position. The ball valve 126 controls the fluid flow rate through the hose 14.

There is provided a reduction gear assembly 130 which operates the ball valve 126 for rotating the ball valve 126 to a variable open position and is controlled by an electric reversible motor 132 housed within the fluid-tight structure 118. The reversible motor 132 is coupled to a drive pinion 140 by a rotating shaft 170, where the drive pinion 140 is coupled to an outer driving wheel 142 of the reduction gear assembly 130. In this configuration of the reduction gear assembly 130, a 2000:1 ratio is achieved for controlling the ball valve 126. The reversible motor 132 is electrically connected to a power supply 134 by electrical wires, where the power supply 134 supplies power to the reversible motor 132. The power supply 134 may be batteries. By way of example, the batteries may be "AA" batteries, "D" batteries, "C" batteries or any other suitable power supply.

The momentary switch 116 is attached to the outflow end of the fluid hose 14 and electrically coupled to the transmitter member 170. The switch 116 includes a forward direction button 146 and a reverse direction button 148. As the switch 116 is pressed, it activates the transmitter member 170 which sends a signal to the receiver member 172 located within the fluid-tight structure 118. The receiver member 172 turns on the reversible motor 132 for controlling the gear reduction assembly 130 which in turn controls the movement of the ball valve 126. As the forward direction button 146 is continuously being pressed by the user, the ball valve 126 is continuously being incrementally open until the ball valve 126 is in the fully open position (see FIG. 3). When the user stops pressing on the forward direction button 146, the ball valve 126 will stop at whatever position it was at, thereby allowing a control flow rate to be created through the hose 14. As the reverse direction button 148 is continuously being pressed by the user, the ball valve is continuously being incrementally closed until the ball valve 126 is in the fully closed position (see FIG. 4). There is provided a limit switch 160 for limiting the rotation of the ball valve 126. The limit switch 160 functions with a lever having a ball at one end. A rotating plate is attached to the ball valve 126 by the rotating axle 128, where the rotating plate is part of the gear reduction assembly 130. The rotating plate has two detents located on the perimeter and spaced apart by 90°. When the gear reduction assembly 130 rotates 90°, the ball lever of the limit switch 160 drops into the second detent indicating that the ball valve 126 is fully on and when it rotates back 90° it drops into the first detent indicating that the ball valve 126 is fully off.

Further activation of the forward direction button 146 or the reverse direction button 148 can continuously vary the flow rate to increase or decrease, thereby opening the ball valve 126 or closing the ball valve 126.

Defined in detail, the present invention is a fluid flow control apparatus for controlling and delivering fluid at a continuously variable flow rate, the apparatus comprising: (a) a fluid-tight housing; (b) a valve tube body housed within the fluid-tight housing and extending the length of the fluid-tight housing and out at both ends of the fluid-tight housing; (c) a female hose connector integrally formed at one end of the valve tube body for connecting to a fluid supply source; (d) an elongated flexible hose having an outflow end and the other end coupled to the other end of the valve tube body and in-fluid communication with the female hose connector; (e) a rotatable ball valve installed within the valve tube body and having a rotating shaft extending out from a sidewall of the valve tube body and operationally connected to an electric reversible motor through a coupling member so as to be thereby rotated to continuously and incrementally varying the fluid flow rate through the flexible hose; (f) an activating switch located at the outflow end of the flexible hose and electrically coupled to the reversible motor, the switch having a forward direction button and a reverse direction button for controlling the direction of the motor; and (g) means for supplying power to the reversible motor; (h) whereby the ball valve is rotatable for continuously varying the fluid flow rate through the flexible hose.

Defined broadly, the present invention is a fluid flow control apparatus for controlling and delivering fluid at a continuously variable flow rate through a hose, the apparatus comprising: (a) a housing; (b) a valve tube body housed within the housing and extending the length of the housing and out at both ends of the housing; (c) a female connector attached at one end of the valve tube body for connecting to a fluid supply source; (d) a male connector attached at the other end of the valve tube body for connecting to the hose and in-fluid communication with the female connector; (e) a rotatable ball valve installed within the valve tube body and having a shaft extending out from the valve tube body and operationally connected to a motor through a coupling member so as to be thereby rotated for continuously and incrementally varying the fluid flow rate through the hose; (f) a switch coupled to the motor and having a forward direction button and a reverse direction button for controlling the direction of the motor; and (g) means for supplying power to the motor; (h) whereby the ball valve is rotatable for continuously varying the fluid flow rate through the hose.

Defined more broadly, the present invention is a fluid flow control apparatus for controlling and delivering fluid at a continuously variable flow rate through a hose, the apparatus comprising: (a) a valve tube body; (b) a first connector connected at one end of the valve tube body for connecting to a fluid supply source; (c) a second connector connected at the other end of the valve tube body for connecting to the hose and in-fluid communication with the first connector; (d) a ball valve installed within the valve tube body and having a shaft extending out from the valve tube body and operationally connected to a motor through a coupling member so as to be thereby rotated for continuously and incrementally varying the fluid flow rate through the hose; (e) means for controlling the direction of the motor and attached to the hose and located remote from the valve tube body; and (f) means for supplying power to the motor; (g) whereby the ball valve is rotatable for continuously varying the fluid flow rate through the hose.

Further defined in detail, the present invention is a fluid flow control apparatus for controlling and delivering fluid at a continuously variable flow rate, the apparatus comprising: (a) a fluid-tight housing; (b) a valve tube body housed within the fluid-tight housing and extending the length of the fluid-tight housing and out at both ends of the fluid-tight housing; (c) a female hose connector integrally formed at one end of the valve tube body for connecting to a fluid supply source; (d) an elongated flexible hose having an outflow end and the other end coupled to the other end of the valve tube body and in-fluid communication with the female hose connector; (e) a rotatable ball valve installed within the valve tube body and having a rotating shaft extending out from a sidewall of the valve tube body and operationally connected to an electric reversible motor through a coupling member so as to be thereby rotated to continuously and incrementally varying the fluid flow rate through the flexible hose; (f) an activating switch located at the outflow end of the flexible hose and having a forward direction button and a reverse direction button for controlling the direction of the reversible motor; (g) a transmitter operatively coupled to the switch and activating one of the buttons of the switch commands the transmitter to transmit a signal to a receiver; (h) the receiver housed within the fluid-tight structure and operatively coupled to the reversible motor, the receiver receiving the signal from the transmitter which in turn activates the motor, which in turn rotates the coupling member to rotate the ball valve; and (i) means for supplying power to the reversible motor; (j) whereby the ball valve is rotatable for continuously varying the fluid flow rate through the flexible hose.

Further defined broadly, the present invention is a fluid flow control apparatus for controlling and delivering fluid at a continuously variable flow rate through a hose, the apparatus comprising: (a) a housing; (b) a valve tube body housed within the housing and extending the length of the housing and out at both ends of the housing; (c) a female connector attached at one end of the valve tube body for connecting to a fluid supply source; (d) a male connector attached at the other end of the valve tube body for connecting to the hose and in-fluid communication with the female connector; (e) a rotatable ball valve installed within the valve tube body and having a shaft extending out from the valve tube body and operationally connected to a motor through a coupling member so as to be thereby rotated for continuously and incrementally varying the fluid flow rate through the hose; (f) a switch coupled to the motor and having a forward direction button and a reverse direction button for controlling the direction of the motor; (g) a transmitter operatively coupled to the switch and activating one of the buttons of the switch commands the transmitter to transmit a signal to a receiver; (h) the receiver housed within the fluid-tight structure and operatively coupled to the motor, the receiver receiving the signal from the transmitter which in turn activates the motor, which in turn rotates the coupling member to rotate the ball valve; and (i) means for supplying power to the motor; (j) whereby the ball valve is rotatable for continuously varying the fluid flow rate through the hose.

Further defined more broadly, the present invention is a fluid flow control apparatus for controlling and delivering fluid at a continuously variable flow rate through a hose, the apparatus comprising: (a) a valve tube body; (b) a first connector connected at one end of the valve tube body for connecting to a fluid supply source; (c) a second connector connected at the other end of the valve tube body for connecting to the hose and in-fluid communication with the first connector; (d) a ball valve installed within the valve tube body and having a shaft extending out from the valve tube body and operationally connected to a motor through a coupling member so as to be thereby rotated for continuously and incrementally varying the fluid flow rate through the hose; (e) means for controlling the direction of the motor and attached to the hose and located remote from the valve tube body; (f) a transmitter operatively coupled to the controlling means and activating the controlling means commands the transmitter to transmit a signal to a receiver; (g) the receiver operatively coupled to the motor for receiving the signal from the transmitter which in turn activates the motor, which in turn rotates the coupling member to rotate the ball valve; and (h) means for supplying power to the motor; (i) whereby the ball valve is rotatable for continuously varying the fluid flow rate through the hose.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features of principles of the present invention, or the scope of the patent to be granted. Therefore, the invention is to be limited only by the scope of the appended claims.

What is claimed is:

1. A fluid flow control apparatus for controlling and delivering fluid at a continuously variable flow rate, the apparatus comprising:
   a. a fluid-tight housing;
   b. a valve tube body housed within said fluid-tight housing and extending the length of said fluid-tight housing and out at both ends of said fluid-tight housing;
   c. a female hose connector integrally formed at one end of said valve tube body for connecting to a fluid supply source;
   d. an elongated flexible hose having an outflow end and the other end coupled to the other end of said valve tube body and in-fluid communication with said female hose connector;
   e. a rotatable ball valve installed within said valve tube body and having a rotating shaft extending out from a sidewall of said valve tube body and operationally connected to an electric reversible motor through a coupling member so as to be thereby rotated to continuously and incrementally varying the fluid flow rate through said flexible hose;
   f. an activating switch located at said outflow end of said flexible hose and electrically coupled to said reversible motor, the switch having a forward direction button and a reverse direction button for controlling the direction of said motor; and
   g. means for supplying power to said reversible motor;
   h. whereby said ball valve is rotatable for continuously varying the fluid flow rate through said flexible hose.

2. The apparatus in accordance with claim 1, wherein said coupling member is a reduction gear assembly.

3. The apparatus in accordance with claim 1, wherein said means for supplying power includes batteries.

4. The apparatus in accordance with claim 1, further comprising a limit switch for limiting the rotation of said ball valve.

5. A fluid flow control apparatus for controlling and delivering fluid at a continuously variable flow rate through a hose, the apparatus comprising:
   a. a housing;
   b. a valve tube body housed within said housing and extending the length of said housing and out at both ends of said housing;
   c. a female connector attached at one end of said valve tube body for connecting to a fluid supply source;
   d. a male connector attached at the other end of said valve tube body for connecting to said hose and in-fluid communication with said female connector;
   e. a rotatable ball valve installed within said valve tube body and having a shaft extending out from said valve tube body and operationally connected to a motor through a coupling member so as to be thereby rotated for continuously and incrementally varying the fluid flow rate through said hose;
   f. a switch located on the hose and coupled to said motor and having a forward direction button and a reverse direction button for controlling the direction of said motor; and
   g. means for supplying power to said motor;

h. whereby said ball valve is rotatable for continuously varying the fluid flow rate through said hose.

6. The apparatus in accordance with claim 5, wherein said coupling member is a reduction gear assembly.

7. The apparatus in accordance with claim 5, wherein said means for supplying power includes batteries.

8. The apparatus in accordance with claim 5, wherein said motor includes an electric reversible motor.

9. The apparatus in accordance with claim 5, further comprising a limit switch for limiting the rotation of said ball valve.

10. A fluid flow control apparatus for controlling and delivering fluid at a continuously variable flow rate through a hose, the apparatus comprising:
   a. a valve tube body;
   b. a first connector connected at one end of said valve tube body for connecting to a fluid supply source;
   c. a second connector connected at the other end of said valve tube body for connecting to said hose and in-fluid communication with said first connector;
   d. a ball valve installed within said valve tube body and having a shaft extending out from said valve tube body and operationally connected to a motor through a coupling member so as to be thereby rotated for continuously and incrementally varying the fluid flow rate through said hose;
   e. means for controlling the direction of said motor and attached to said hose and located remote from said valve tube body wherein said means for controlling the direction of said motor includes an activating switch located at an outflow end of said flexible hose, the switch having a forward direction button and a reverse direction button for controlling the direction of said motor; and
   f. means for supplying power to said motor;
   g. whereby said ball valve is rotatable for continuously varying the fluid flow rate through said hose.

11. The apparatus in accordance with claim 10, wherein said first connector includes a female hose connector.

12. The apparatus in accordance with claim 10, wherein said second connector includes a male connector.

13. The apparatus in accordance with claim 10, wherein said coupling member is a reduction gear assembly.

14. The apparatus in accordance with claim 10, wherein said means for supplying power includes batteries.

15. The apparatus in accordance with claim 10, wherein said motor includes an electric reversible motor.

16. The apparatus in accordance with claim 10, further comprising a limit switch for limiting the rotation of said ball valve.

17. A fluid flow control apparatus for controlling and delivering fluid at a continuously variable flow rate, the apparatus comprising:
   a. a fluid-tight housing;
   b. a valve tube body housed within said fluid-tight housing and extending the length of said fluid-tight housing and out at both ends of said fluid-tight housing;
   c. a female hose connector integrally formed at one end of said valve tube body for connecting to a fluid supply source;
   d. an elongated flexible hose having an outflow end and the other end coupled to the other end of said valve tube body and in-fluid communication with said female hose connector;
   e. a rotatable ball valve installed within said valve tube body and having a rotating shaft extending out from a sidewall of said valve tube body and operationally connected to an electric reversible motor through a coupling member so as to be thereby rotated to continuously and incrementally varying the fluid flow rate through said flexible hose;
   f. an activating switch located at said outflow end of said flexible hose and having a forward direction button and a reverse direction button for controlling the direction of said reversible motor;
   g. a transmitter operatively coupled to said switch and activating one of said buttons of said switch commands the transmitter to transmit a signal to a receiver;
   h. said receiver housed within said fluid-tight structure and operatively coupled to said reversible motor, said receiver receiving said signal from said transmitter which in turn activates said motor, which in turn rotates said coupling member to rotate said ball valve; and
   i. means for supplying power to said reversible motor;
   j. whereby said ball valve is rotatable for continuously varying the fluid flow rate through said flexible hose.

18. The apparatus in accordance with claim 17, wherein said coupling member is a reduction gear assembly.

19. The apparatus in accordance with claim 17, wherein said means for supplying power includes batteries.

20. The apparatus in accordance with claim 17, further comprising a limit switch for limiting the rotation of said ball valve.

21. A fluid flow control apparatus for controlling and delivering fluid at a continuously variable flow rate through a hose, the apparatus comprising:
   a. a housing;
   b. a valve tube body housed within said housing and extending the length of said housing and out at both ends of said housing;
   c. a female connector attached at one end of said valve tube body for connecting to a fluid supply source;
   d. a male connector attached at the other end of said valve tube body for connecting to said hose and in-fluid communication with said female connector;
   e. a rotatable ball valve installed within said valve tube body and having a shaft extending out from said valve tube body and operationally connected to a motor through a coupling member so as to be thereby rotated for continuously and incrementally varying the fluid flow rate through said hose;
   f. a switch located on the hose and coupled to said motor and having a forward direction button and a reverse direction button for controlling the direction of said motor;
   g. a transmitter operatively coupled to said switch and activating one of said buttons of said switch commands the transmitter to transmit a signal to a receiver;
   h. said receiver housed within said fluid-tight structure and operatively coupled to said motor, said receiver receiving said signal from said transmitter which in turn activates said motor, which in turn rotates said coupling member to rotate said ball valve; and
   i. means for supplying power to said motor;
   j. whereby said ball valve is rotatable for continuously varying the fluid flow rate through said hose.

22. The apparatus in accordance with claim 21, wherein said coupling member is a reduction gear assembly.

23. The apparatus in accordance with claim 21, wherein said means for supplying power includes batteries.

24. The apparatus in accordance with claim 21, wherein said motor includes an electric reversible motor.

25. The apparatus in accordance with claim 21, further comprising a limit switch for limiting the rotation of said ball valve.

26. A fluid flow control apparatus for controlling and delivering fluid at a continuously variable flow rate through a hose, the apparatus comprising:
   a. a valve tube body;
   b. a first connector connected at one end of said valve tube body for connecting to a fluid supply source;
   c. a second connector connected at the other end of said valve tube body for connecting to said hose and in-fluid communication with said first connector;
   d. a ball valve installed within said valve tube body and having a shaft extending out from said valve tube body and operationally connected to a motor through a coupling member so as to be thereby rotated for continuously and incrementally varying the fluid flow rate through said hose;
   e. means for controlling the direction of said motor and attached to said hose and located remote from said valve tube body wherein said means for controlling the direction of said motor includes an activation switch located at an outflow end of said flexible hose, the switch having a forward direction button and a reverse direction button for controlling the direction of said motor;
   f. a transmitter operatively coupled to said controlling means and activating said controlling means commands the transmitter to transmit a signal to a receiver;
   g. said receiver operatively coupled to said motor for receiving said signal from said transmitter which in turn activates said motor, which in turn rotates said coupling member to rotate said ball valve; and
   h. means for supplying power to said motor;
   i. whereby said ball valve is rotatable for continuously varying the fluid flow rate through said hose.

27. The apparatus in accordance with claim 26, wherein said first connector includes a female hose connector.

28. The apparatus in accordance with claim 26, wherein said second connector includes a male connector.

29. The apparatus in accordance with claim 26, wherein said coupling member is a reduction gear assembly.

30. The apparatus in accordance with claim 26, wherein said means for supplying power includes batteries.

31. The apparatus in accordance with claim 26, wherein said motor includes an electric reversible motor.

32. The apparatus in accordance with claim 26, further comprising a limit switch for limiting the rotation of said ball valve.

* * * * *